United States Patent [19]
Borschert et al.

[11] Patent Number: 6,105,448
[45] Date of Patent: Aug. 22, 2000

[54] ACTUATING DEVICE FOR AUTOMATICALLY ACTUATING A MANUAL TRANSMISSION

[75] Inventors: Udo Borschert, Sennfeld; Mario Bühner, Gerolzhofen; Lutz Leimbach, Schweinfurt; Jens Dorfschmid, Notzingen, all of Germany

[73] Assignee: Mannesmann Sachs AG, Schweinfurt, Germany

[21] Appl. No.: 09/086,507

[22] Filed: May 28, 1998

[30] Foreign Application Priority Data

| May 28, 1997 | [DE] | Germany | 197 22 312 |
| May 8, 1998 | [DE] | Germany | 198 20 577 |

[51] Int. Cl.[7] ................................................ F16H 63/40
[52] U.S. Cl. .................................................... 74/335
[58] Field of Search ................................................. 74/335

[56] References Cited

U.S. PATENT DOCUMENTS

| 4,911,031 | 3/1990 | Yoshimura et al. | 74/335 |
| 5,219,391 | 6/1993 | Edelen et al. | 74/335 |
| 5,916,326 | 6/1999 | Tischer | 74/335 |

FOREIGN PATENT DOCUMENTS

| 599 511 | 6/1994 | European Pat. Off. . |
| 38 36 145 | 4/1990 | Germany . |
| 39 40 590 | 6/1990 | Germany . |
| 43 09 027 | 9/1994 | Germany . |
| 36 13 800 | 12/1994 | Germany . |
| 43 36 445 | 4/1995 | Germany . |
| 195 48 799 | 6/1996 | Germany . |
| 44 33 825 | 8/1996 | Germany . |

Primary Examiner—Dirk Wright
Attorney, Agent, or Firm—Cohen, Pontani, Lieberman & Pavane

[57] ABSTRACT

An actuating device for automatically actuating a manual transmission, which has an output element that can be driven in a first direction by a first drive and in a second direction by a second drive. Each drive is assigned a sensor which displays an actuating movement and detects a movement if the output element and whose signals are fed to a control device. In the case of a movement of the output element the sensors output to the control device signals assigned to this movement, the signals specifying the respective magnitude of the movement. The control device uses the signals with reference to an arbitrary prescribable reference point to determine the actual position of the output element and relate the actual position to a desired position of the output element which is to be approached, with the perception that the desired position has not been reached after termination of an actuating movement, or the absence of the signals which indicate the actuating movement causing the control device to activate an emergency function.

22 Claims, 6 Drawing Sheets

ACTUATING DEVICE FOR AUTOMATICALLY ACTUATING A MANUAL TRANSMISSION

BACKGROUND OF THE INVENTION

1. Field of the Invention

The invention relates to an actuating device for automatically actuating a manual transmission.

2. Discussion of the Prior Art

German reference DE 43 09 027 A1 has already disclosed an actuating cylinder for actuating a shifting shaft. The actuating cylinder has a first hydraulic cylinder and a second hydraulic cylinder. The first hydraulic cylinder is a double-acting cylinder which acts on an actuating piston to which the shifting shaft is firmly connected. The shifting shaft can be driven in a translatory fashion by the first hydraulic cylinder. The second hydraulic cylinder is connected via a driver element, which is connected in turn to the actuating piston in a fixed but axially displaceable fashion. A translatory movement of the piston of the second hydraulic cylinder, which is connected to the driver element via spiral teeth, is converted by the driver element into a rotary movement. The shifting shaft can therefore be driven in a rotary fashion by the second hydraulic cylinder. Given an appropriate drive, the shifting shaft can be automatically actuated by the actuating cylinder. Sensors are provided for detecting the paths of the actuating movements which can be initiated by the hydraulic cylinders. For example, it is possible to provide linear potentiometers as sensors. It is preferable to use sensors which operate without contact and which comprise a permanent annular magnet attached to the actuating piston, and a coil element, attached to the cylindrical outer wall of the housing, with primary and secondary windings. The absolute position of the shifting shaft is detected by the sensors. It is disadvantageous that because of the sliding-action contact the linear potentiometers have a short service life, and that the contactless magnetic sensors are very expensive.

European reference EP 599 511 A1 discloses a further device for automatically actuating a transmission. This device comprises a shifting finger which can be deflected via assigned drives into an X-direction and a Y-direction perpendicular thereto. The absolute position of the shifting finger in the respective direction of movement or coordinates is detected in each case by assigned potentiometers. The potentiometers are used to detect the transmission position.

Furthermore, the current which is applied to the drives during driving is sensed. If the sensed values deviate from predetermined values to more than a predetermined extent, the deviation of desired and actual values is reduced or corrected by running through a control loop.

In the case of this device, as well, potentiometers which have a short service life because of the sliding-action contact required are provided for detecting position.

German reference DE 36 13 800 C2 discloses an emergency actuation device which has a mechanical switch to be actuated by the driver. The switch has a plurality of actuating positions, the engagement of a predetermined driving gear being permitted by actuating the switch in a predetermined way. It is disadvantageous that the driver must, on the one hand, know how the emergency switch is to be actuated in the event of failure of the actuating device. Thus, in the stressful situation of a malfunction, the driver must have at his fingertips the required actuating routine in which the switch is to be actuated for the emergency actuation. This is very inconvenient for the driver. Furthermore, only a very restricted driving operation is possible, since only a predetermined driving gear can be engaged by the emergency switch.

German reference DE 44 33 825 C2 discloses a sensor for detecting a relative movement that operates in a contactless fashion.

SUMMARY OF THE INVENTION

It is an object of the present invention to provide an actuating device having reduced production costs and a reduced susceptibility to malfunction.

It was also an object of the invention to provide an emergency actuation device which is convenient for tale driver should a malfunction occur.

Pursuant to these objects, and others which will become apparent hereafter, one aspect of the present invention resides in an actuating device having an output element, first drive means for driving the output element in a first direction, second drive means for driving the output element in a second direction, control means for controlling the first and second drive means, and first sensor means assigned to each of the drive means for detecting movement of the output element and outputting corresponding signals to the control means, which signals specify a respective magnitude of movement. The control means is operative to use the signals with reference to an arbitrary prescribable reference point to determine an actual position of the output element and relate the actual position to a desired position of the output element which is to be approached, whereby perception that the desired position has not been reached after termination of one of an actuating movement and an absence of signals which indicate the actuating movement causes the control means to activate an emergency function. The provision of an arbitrary reference point permits the use of sensors which pick up relative movements to detect the actual position of the output element with reference to the reference point. Sensors which operate without contact to detect a relative movement have been disclosed, for example, in German reference DE 44 33 825 C2. Such sensors are available cost effectively as standard components. In particular, sensors which operate without contact have the advantage, by contrast with potentiometer elements, of operating without wear and thus reliably. The signals of the sensors, which display a relative movement of the output element, are fed to a control device. For control purposes, the control device determines the ACTUAL position of the output element from the signals, which represent the relative movement, with reference to the reference point. In order to control the output element, the ACTUAL position is related to the DESIRED position. If the actuating movement has been terminated, and it has been detected that the DESIRED position has not been reached or that signals indicating an actuating movement are absent, for example due lo the failure of a sensor, the control device is caused to activate an emergency function. Failure to reach a DESIRED position which is to be approached can be detected, for example in the case of a prescribed driving gear to be engaged, by synchronization work performed by the driven drive.

After the synchronization work has been performed, positioning the shifting shaft at the position corresponding to the complete, engaged driving gear requires low power. The synchronization point can be detected by the actuating speed or the power consumption of the drive driving the output element in the gear-selecting direction. It can also be provided to correct the ACTUAL position on the basis of a determined deviation of the detected synchronization point from the expected synchronization point, taking into account the magnitude of deviation. It is advantageous if the output element at least briefly occupies the reference point in an adjusting routine which is carried out in predetermined operating states. The DESIRED position is approached starting from the reference point. The output element is readjusted by the inclusion of the reference point, with the result that inaccuracies within the scope of the tolerance band, which add together in the course of the actuating operation, do not exceed a prescribed maximum.

The adjusting routine is preferably run through upon starting the vehicle, with the result that a slight maladjustment already present is immediately corrected when starting the vehicle or when starting to drive.

Furthermore, it is advantageous to activate the adjusting routine upon sensing of an actuation of the ignition lock and a further actuating signal such as, for example, a signal indicating actuation of the vehicle brake. The requirement for brake actuation upon starting the vehicle is already customary in conventional automatic transmission vehicles.

In a further embodiment of the invention, a restricted adjusting routine can be activated by opening the driver's door. In the case of this restricted adjusting routine, the current gear position of the transmission is not changed. By approaching an end stop, it is possible to carry out a comparison with a reference value already stored in the memory, and the shifting shaft can be positioned at the desired position corresponding to the driving gear selected.

In another embodiment the adjusting routine is run through when it is detected that a stop has been reached in the gear-selecting direction during normal driving operation. The DESIRED positions assigned to the driving gears are arranged with an offset upstream of the respective stop in the gear-selecting direction for the purpose of relieving the transmission in each case. Reaching a stop is evaluated as maladjustment which exceeds a predetermined maximum extent. It is thereby also ensured during the driving operation that maladjustment does not exceed a predetermined maximum. This maximum possible maladjustment must be dimensioned so as always to ensure fault-free actuation of the transmission to be actuated by means of the actuating device.

In still an additional embodiment of the adjusting routine, starting from a change position, the output element occupies the reference point with reference to the second direction of movement. In this case, the change position is the position in which the output element has two degrees of freedom. In the case of an H shift mechanism, the change position is the idling position. Should the reference point with reference to the first direction of movement not yet be occupied, the output element occupies said point by renewed deflection in the first direction of movement.

It has prosed to be advantageous that when at least one stop is reached, the reference point is occupied with reference to one direction of movement. The reference point is occupied in the slot-selecting direction when a stop is reached in a prescribed direction with reference to the direction of movement. It is particularly easy to approach such a stop position by driving the drive assigned to the direction of movement over a maximum required time interval in order to occupy the stop position. If, in the gear-selecting direction, the middle position or idling position is the predetermined position of the reference point with reference to the direction of movement, the reference point can be occupied by a single deflection in each direction of movement. A further sensor can be provided for detecting the change position, with the result that the change position occupied is detected by the control device. If the sensor is not provided, the output element can be occupied by prescribing a driving interval starting from a stop position in the gear-selecting direction.

In a further embodiment of the invention, a control device comprising a time-measuring means is provided. In a prescribed first interval, the output element is prevented from further deflection in the prevailing direction of movement by reaching a stop. The first interval is dimensioned so as to always ensure that the stop is reached in the driven direction of movement. When the stop is reached, the position of the output element is exactly fixed in the direction of movement. If the direction of movement was the gear-selecting direction, starting from this position, the output element is driven in the opposite direction to the first direction of movement in order to occupy the change position.

It is also advantageous to provide at least one drive with a power consumption detector. The power consumption of the respective drive can be used to detect that the output element has struck the stop from a rise in the power consumed by the drive.

The control device is assigned a nonvolatile memory in which signals are stored which represent actuating paths. These signals can be picked up by means of the sensors assigned to the drives. Thus, the actuating paths corresponding to the various driving gears can be stored in the memory via the determined signals. If a driving gear is prescribed as a DESIRED position, the drives are driven by the control device in an appropriate way using the stored signals. The signals are to be input individually for each drive train configuration, in particular in order to adapt to the respective transmission. This compensates for deviations in the actuating paths assigned to the respective driving gears, which result from manufacturing tolerances. It is preferable to input the signals after mounting the drive train by engaging the individual driving gears in a predetermined sequence. This individual inputting compensates for production fluctuations. If a drive train configuration is changed, for example by replacing the transmission, it is necessary to modify the signals stored in the nonvolatile memory in order to ensure the optimum prescription of the DESIRED position corresponding to the desired gear.

It is advantageous for the sensors to detect the actuating movement of the drives directly. The sensors detect the relative movement of the output part of the respective drive. In order to be able to use drives which are as small as possible, the drives are connected to the output element via a reduction gear. The magnitude of the movement of the output part of the drive is thus a multiple of the movement of the output element. Consequently, the magnitude of the resulting movement of the output element can be determined very accurately by detecting the movement of the output part of the drive. The sensors can be integrated directly in the drives in the case of this arrangement. The incremental encoders disclosed in German reference German reference DE 44 33 825 C2 have proved to be particularly suitable sensors. If the drive is provided with a friction clutch, the sensor is to be provided on the output side of the friction clutch in order to detect the movement initiated.

It can also be provided for the corresponding drive to have a friction clutch, thus preventing overloading of the drive in the case of a stop being struck. If the stop is reached, a relative movement occurs between the drive-side input part and output-side output part of the friction clutch. Such a drive provided with a friction clutch has been disclosed, for example, in German reference DE 43 36 445 A1.

In the case of an activated emergency function, the output element occupies the DESIRED position, starting from an emergency reference point. The output element is driven over a first emergency control time interval by the first drive in order to occupy the DESIRED position. The first emergency control time interval is dimensioned so as to ensure that the output element bears against the stop located in the drive direction. The position of the output element with reference to the first direction of movement is thereby known. This information is used to position the output element at the change position. In order to occupy the change position, the output element is advantageously driven by the first drive in the opposite direction over a definitively prescribed time interval. The time required to move the output element from the stop position into the change position is preferably stored in the control device. It can also be provided to position the output element at the change position by prescribing the power of the driven drive, for example by prescribing a predetermined drive power profile.

In an additional embodiment, the output element is driven alternately by both drives shortly before potentially reaching the change position. If the output element can be deflected in the second direction of movement, the change position has been reached or already driven through. This drive ensures that, even in the case of drive fluctuations, for example due to the occurrence of difficulty of movement with the resulting, necessarily higher power or longer time, the change position will certainly be reached with the possibility of a change in the direction of movement, and that the output element occupies this at least briefly. It is not possible by means of a pure prescription of time or the prescription of a drive power profile to approach a prescribed position in a pinpointed fashion as exactly as when the magnitude of the actuating movement is detected and monitored by sensors. This relatively large fault tolerance can be compensated for when driving the two drives by alternately driving them in the region of the change position. It is also possible here to detect the change position when detecting the power consumed by the drives. If the output element cannot be deflected in the drive direction, there is a rise in the power consumed by the respective drive. If a deflection in the respectively driven direction of movement can be deduced from the power consumption of the two drives in two successive drive time intervals on the basis of a low power consumption, the change position is occupied or has already been driven through. Whether the change position has already been driven through or is only occupied depends on the magnitude of the drive time intervals.

If the change position is occupied, the output element is brought to bear against the stop located in the drive direction by driving the second drive over a second emergency time interval. When this stop is reached, the position of the output element with reference to the second direction of movement is also known, with the result that the instantaneous position of the output element is known with reference to both directions of movement. Starting from this defined position, the output element is positioned at the emergency reference point if the stop position occupied, which is predestined to be an emergency reference point, is not the predetermined emergency reference point.

If only one of the sensors assigned to the drives has failed, the signals of the sensors which are still serviceable can be used by the control device for pinpointed control of the drives. Furthermore, it has proved to be advantageous to assign the emergency function a nonvolatile memory in which drive time intervals or drive power profiles which are assigned to the various driving gears and intended for engaging the desired driving gear by means of the drives are stored. Consequently, further serviceability of the actuating device is ensured even in the case of failure of one or more sensors, it no longer being possible to approach the prescribed DESIRED position so exactly. It is therefore necessary to accept losses in convenience such as, for example, relatively frequently running through the adjusting routine and the lengthening of the time required to change a driving gear. It is therefore advantageous to display the activation of the emergency function to the driver so that he seeks out a workshop to remedy the effect as soon as possible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
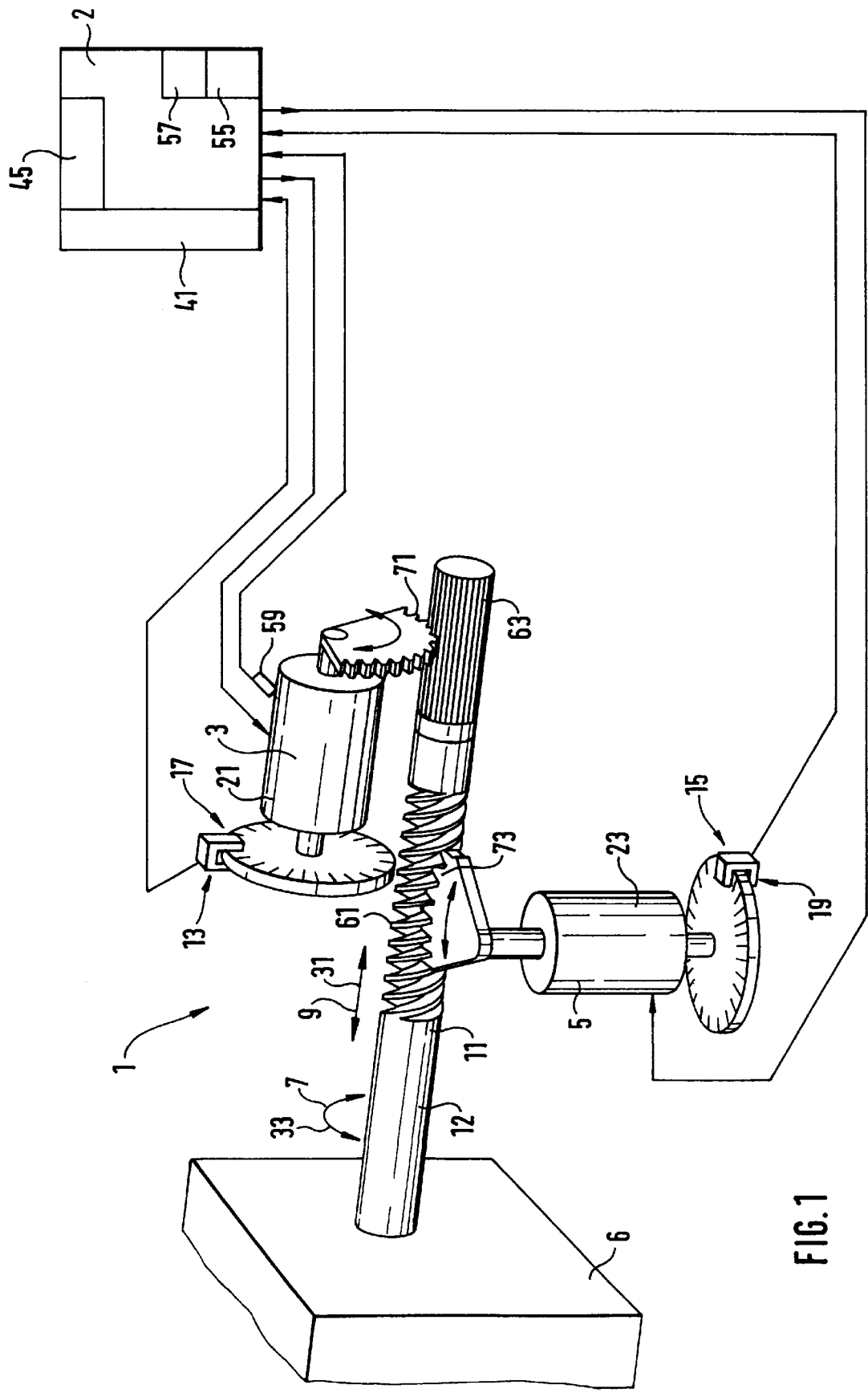
FIG. 1 shows an actuating device for automatically actuating a manual transmission.

The principle of the inventive actuating device 1 is firstly described with the aid of FIG. 1. The actuating device 1 for actuating a manual transmission 6 by means of an auxiliary force comprises a first drive 3 and a second drive 5. Two electric motors 21, 23 are provided as the drives 3, 5 in this embodiment. The first electric motor 21 has an output part which is in the form of a segmented wheel and has teeth 71 which engage with axially extending teeth, termed axial teeth 63 below, of a shifting shaft 12. On a further subsection, the shifting shaft 12 has radially extending (radial teeth) 61 which engage with teeth 73 of an output part, in the form of a segmented wheel, of the second electric motor 23. The electric motors 21, 23 are provided in each case with a sensor 13, 15, whose signals are relayed to a control device 2. The electric motors 21, 23 can be driven by the control device 2. The control device 2 comprises, for its part, an emergency control function 55 and a nonvolatile memory 45 in which signals corresponding to the various driving gears are stored.

The mode of operation of the actuating device 1 will be considered in detail below.

It can be provided that an adjusting routine is firstly run through each time the vehicle is started. In this case, the control device 2 can detect the driver's wish to start the vehicle, for example in the case of a signal present which indicates actuation of an ignition lock in conjunction with a signal which characterizes a further actuation, for example a signal derived from the brake lights or a signal characterizing brake actuation. The actuated brake simultaneously prevents the vehicle from rolling away when the adjusting routine is being run through.

Once the adjusting routine has been run through or virtually run through, the starter is released by the control device.

With at least one restricted version, in which there is no need to disengage an engaged driving gear, it can also be provided to activate an adjusting routine by opening the driver's door with the handbrake applied. In the restricted version of the adjusting routine, it is not mandatory to secure against rolling away by means of an actuated brake.

The driving of the drives by the control device 2 is examined in more detail below.

When the vehicle is started, the shifting shaft 12 is positioned by appropriately driving the drives 3, 5 by means of the control device 2 to a reference point 49 (see FIG. 3) stored in the control device 2. If the driving gear was engaged when starting the vehicle, the first drive 3 is firstly driven by the control device 2 to disengage the driving gear. While the first drive 3 is being driven, the relative movement of the output part 11 is picked up by the sensor 15 assigned to the first drive 3, and relayed to the control device 2. With the aid of this signal, the control device 2 determines the instantaneous position, and positions the output part 11 exactly at the change position 53, which is here the idling position 54. When the idling position 54 is occupied, the output element 11, here the shifting shaft 12, is positioned at the slot position corresponding to the reference point 49 by driving the second drive 5. It is not necessary to detect this actuating movement if the first or last slot is the selected reference point 49 in the slot-selecting direction 31. If, for example, the first slot is selected as the reference point 49 in the slot-selecting direction, the shifting shaft 12 is brought into the stop position 27 by the second drive 5. The second drive 5 is driven by the control device 2 so as to ensure that the stop position 27 is reached. For example, it can be ensured that the stop position 27 is reached by driving the drive 5 by prescribing a predetermined time interval of a prescribed drive profile or via the drive power detected by a power consumption detector 59.

The driving gear determined by the control device 2 is prescribed as a DESIRED position. The control device 2 now returns to the signals stored in the memory 45 and assigned to the driving gear. The drives 3, 5 are driven in the predetermined fashion in accordance with said signals. The actuating movement initiated by the respective drive 3, 5 is sensed by the sensor 13, 15 and fed to the control device 2, with the result that the drives 3, 5 are driven as a function of the sensor signals fed to the control device 2. The shifting shaft 12 is thus adjusted by being controlled away to the DESIRED position. If the path prescribed for occupation has been covered, the actuating movement is thereby terminated. It can be provided in addition to include the signals representing the force required, if this information is available to the control device 2.

If the need to change gear is detected by the control device 2, the position assigned to the driving gear is the new DESIRED position. The path to be covered in order to occupy the DESIRED position 47 assigned to the driving gear is predetermined by means of the signals stored in the memory 45. The path can be provided for occupying the direct drive without briefly occupying the reference point 49. The new DESIRED position is then approached by forming the difference between the paths to be covered. The drives 3, 5 are driven in accordance with the paths to be covered. If a mechanical striking of a stop 25, 27, which can be arranged in the transmission or in the housing of the actuating device 1, is detected during the drive, the striking is evaluated as maladjustment. Striking the stop 25, 27 can be detected while the drive is being driven, for example by a missing signal of the sensor 13, 15 assigned to the driven drive 3, 5. Starting from this position, the drives 3, 5 are driven to occupy the reference point 49. If a stop 25 assigned to a driving gear is occupied, the idling position 54 is approached first. The direction of the first drive 3 driving the shifting shaft 12 is reversed for this purpose. The shifting shaft 12 is driven in the opposite direction. If the expected signal of the sensor 13 assigned to the first drive 3 continues to be missing, the emergency function 55 of the control device 2 is activated. If the first drive 3 is defective, the desired driving gear can no longer be engaged automatically. As a result, the vehicle remains stationary. If the sensor 13 indicating the actuating movement is defective, the DESIRED position is occupied, under the control of the emergency function 55. The mode of operation of the emergency function 55 is to be examined in detail later.

A maladjustment is present if, with the reversal of the driven direction of the first drive 3 driving the shifting shaft 12, the control device 2 again receives from the sensor 13 a signal indicating an actuating movement. If a stop has been occupied during selection of a gear, the first drive 3 is driven to disengage the gear. When the idling position 54 is occupied, the reference point 49 is approached in the slot-selecting direction 31. As previously described, the DESIRED position is approached starting from the reference point 49.

A maladjustment in the gear-selecting direction 33 and the slot-selecting direction 31 is corrected by running through the adjusting routine. If, when the DESIRED position is being approached in the slot-selecting direction 31, the stop is struck in the case of a reference point 49 deviating from the stop 27, a maladjustment is detected. If the actuating path between the two stops 27 present in the slot-selecting direction 31 is stored in the control device, it is possible to carry out a correction without approaching the reference point 49 from knowledge of the instantaneously occupied stop position 27.

If the stop 25 has been occupied in the gear-selecting direction 33, it is possible to carry out a correction by approaching the position 26, which is arranged with a prescribed offset 24 upstream of the stop 25 and assigned to the gear. It is necessary for this purpose for the actuating path corresponding to the offset 24 to be stored in the control device 2. These corrections are relative corrections by means of which it is possible to compensate for an error which has occurred by summing up the inaccuracies caused by the fault tolerance. However, if the instantaneous actuating position of the shifting shaft 12 is entirely unknown because of a brief malfunction, it is necessary to run through the adjusting routine for the purpose of readjustment.

The emergency function of the control device 2 is described in more detail below. With the emergency function 55 activated, it is possible to occupy a prescribed DESIRED position without the signals indicating the actuating movement. The stop positions 25, 27 are known from the signals stored in a memory 57 assigned to the emergency function 55, or in the memory 45 in the control device 2. If the stop 25 is occupied in the gear-selecting direction 33, the shifting shaft 12 is positioned at the idling position 54, given the prescription of a drive time or a drive profile. Starting from the idling position 54, the emergency reference point 51 is occupied in the slot-selecting direction 31. The prescribed DESIRED position is approached by means of the signals stored in the nonvolatile memory 57 of the emergency function 55. Each DESIRED position, such as a driving gear or the idling position, is assigned a drive profile or drive time profile in the memory 57 by means of signals. This approaching of the prescribed DESIRED position is not as exact as the approach during normal operation. It can be provided that the emergency reference point is occupied at least briefly for each gear change. The active emergency function 55 is indicated to the driver.

Figure 2:
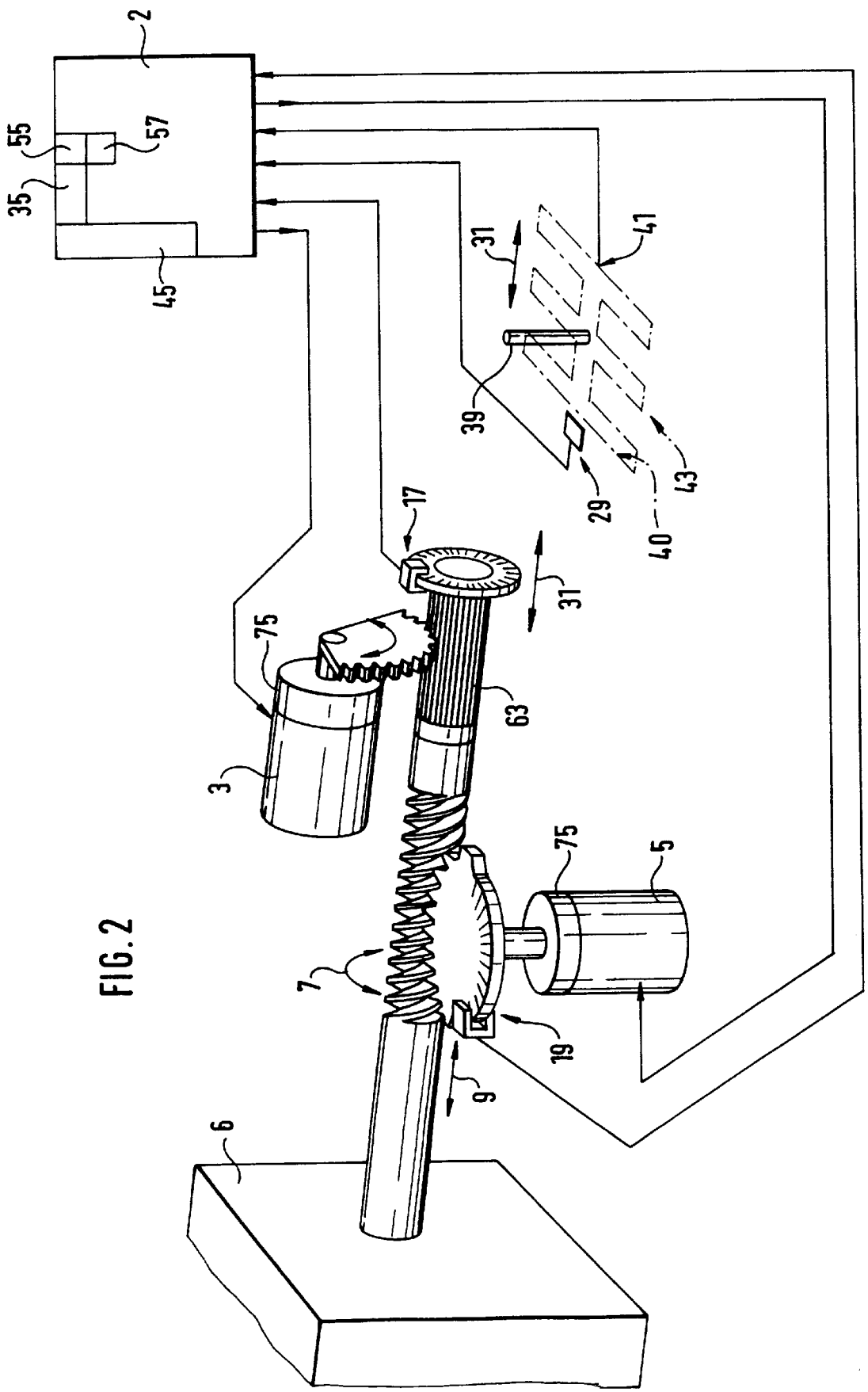
FIG. 2 shows an actuating device with a device for prescribing a driving gear.

A further embodiment is described with the aid of FIG. 2. In the case of this actuating device 2, the drives 3, 5 are provided with friction clutches 75, thus preventing overloading of the respective drive 3, 5 in the case of continuing driving when the stop 25, 27 has already been occupied. The sensors 13, 15, here incremental encoders 17, 19, for sensing the actuating movement are respectively arranged on the output side of the friction clutch 75. The friction clutch 75 is designed so that it provides a firm connection between the output part of the drive and the shifting shaft 12 during normal actuating operation. If the shifting shaft 12 strikes the stop by continuing to be driven, the friction clutch 75 slides through. The respective sensor 13, 15 detects no or a greatly reduced actuating movement. The control device 2 evaluates this as maladjustment. As already described with the aid of FIG. 1, the drives 3, 5 are driven for readjustment.

The control device 2 also has a time-measuring means 35 in this embodiment. The idling position 54 can be approached starting from a selected gear by prescribing a drive time interval of the drive 3. Signals, by means of which a prescribed DESIRED position can be approached by prescribing drive times of the drives 3, 5, can be stored in the memory 45 of the control device 2 or the emergency function 55. Differing from the embodiment represented in FIG. 1, the manual prescription of a DESIRED position can be prescribed manually by the driver by positioning a gear shift lever 39 provided with a sensor 29, 41, as disclosed in German reference DE 38 36 145 A1, for example.

Figure 3:
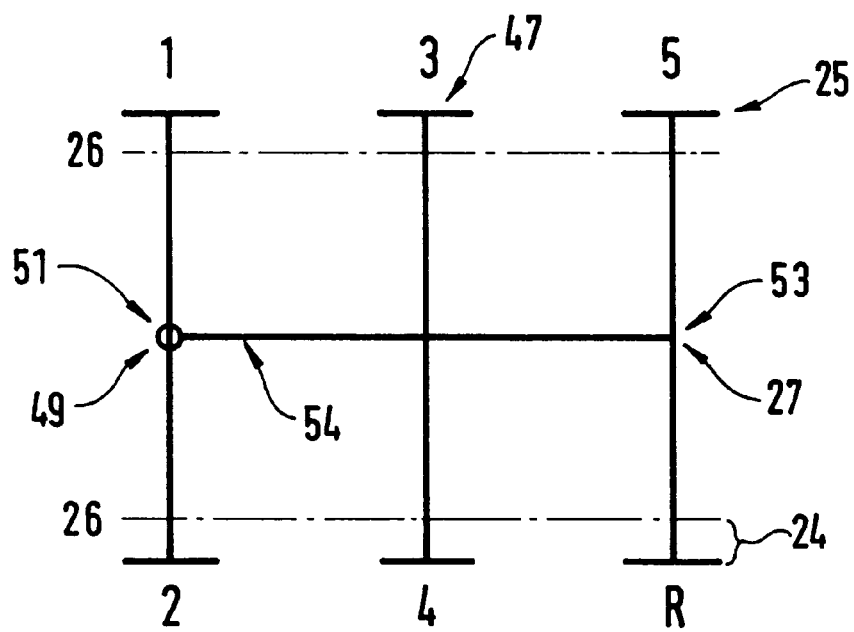
FIG. 3 shows a shifting gate.
Figure 5:
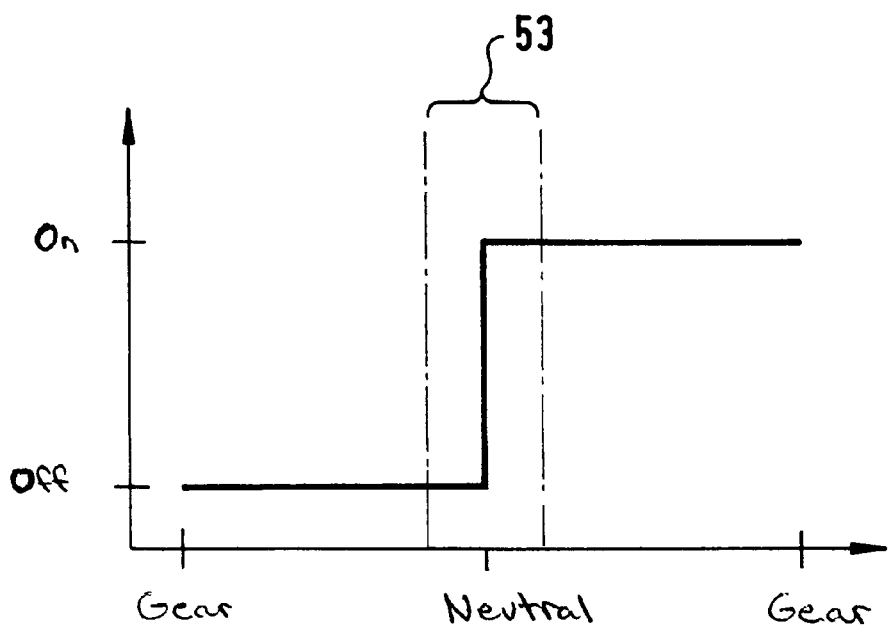
FIG. 5 shows the signal profile of the sensor for detecting the neutral position.

FIG. 3 shows a shifting gate 43 of an H shift mechanism. The shifting gate 43 is assigned to the gear shift lever 39 and is virtually integrated into the control device 2 in the case of the actuating device 2 without a shift lever 39. The DESIRED positions 47 corresponding to the shift positions 40 of the driving gears 1–5 and R have been fixed with an offset 24 ahead of the stop 25 assigned to said gear.

Figure 4:
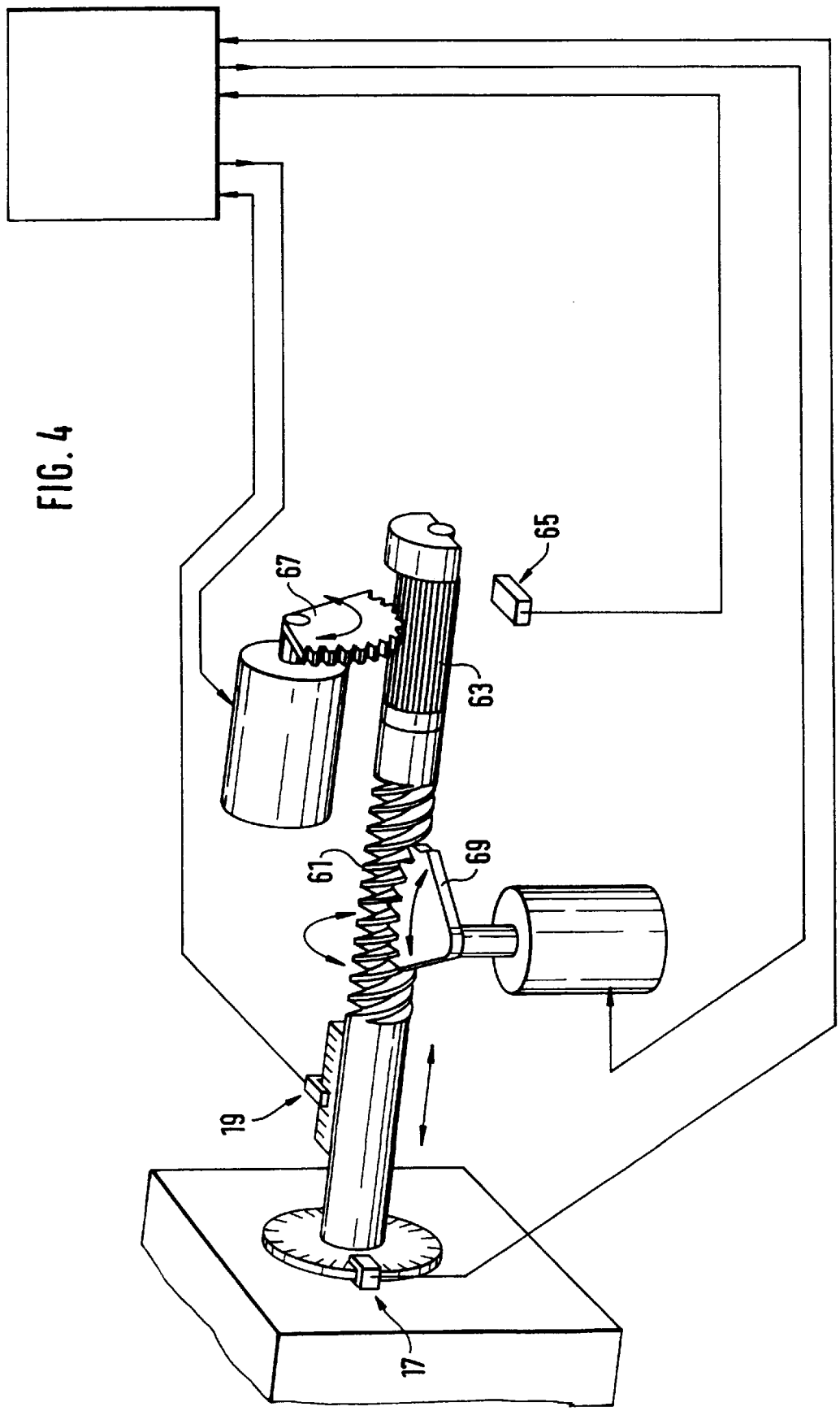
FIG. 4 shows an actuating device with an additional sensor for detecting the neutral position.

In the embodiment represented in FIG. 4, a further sensor 65 is provided, which indicates the idling position. In this embodiment, the incremental encoders 17, 19 sensing the actuating movement are connected to the shifting shaft 12. The mode of operation of the actuating device 2 does not differ from the mode of operation of the actuating device 2 described with the aid of FIG. 1, except that the sensor 65 senses when the idling position 54 is reached and relays this to the control device 2. The half side on which the shifting shaft is located is additionally known from the signal, led from the sensor 65 to the control device 2, by means of the sensor 65 represented in the illustrated embodiment. Consequently, the required driving direction of the drive 3 for directly occupying the idling position is known. The sensor 65 represented is only an exemplary embodiment of a multiplicity of sensors which can be used to detect a prominent position.

Figure 6:
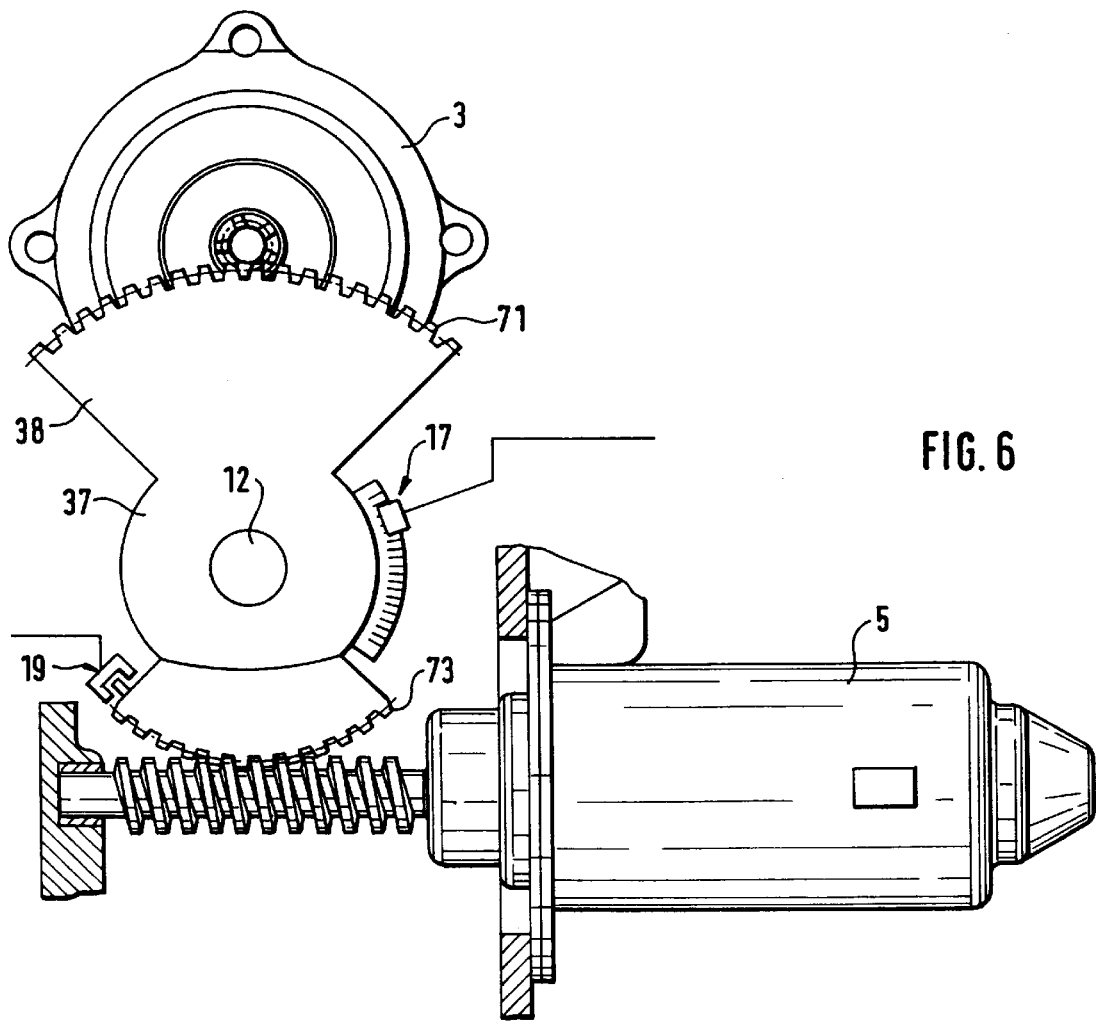
FIG. 6 shows an actuating device with a transmitting element.
Figure 7:
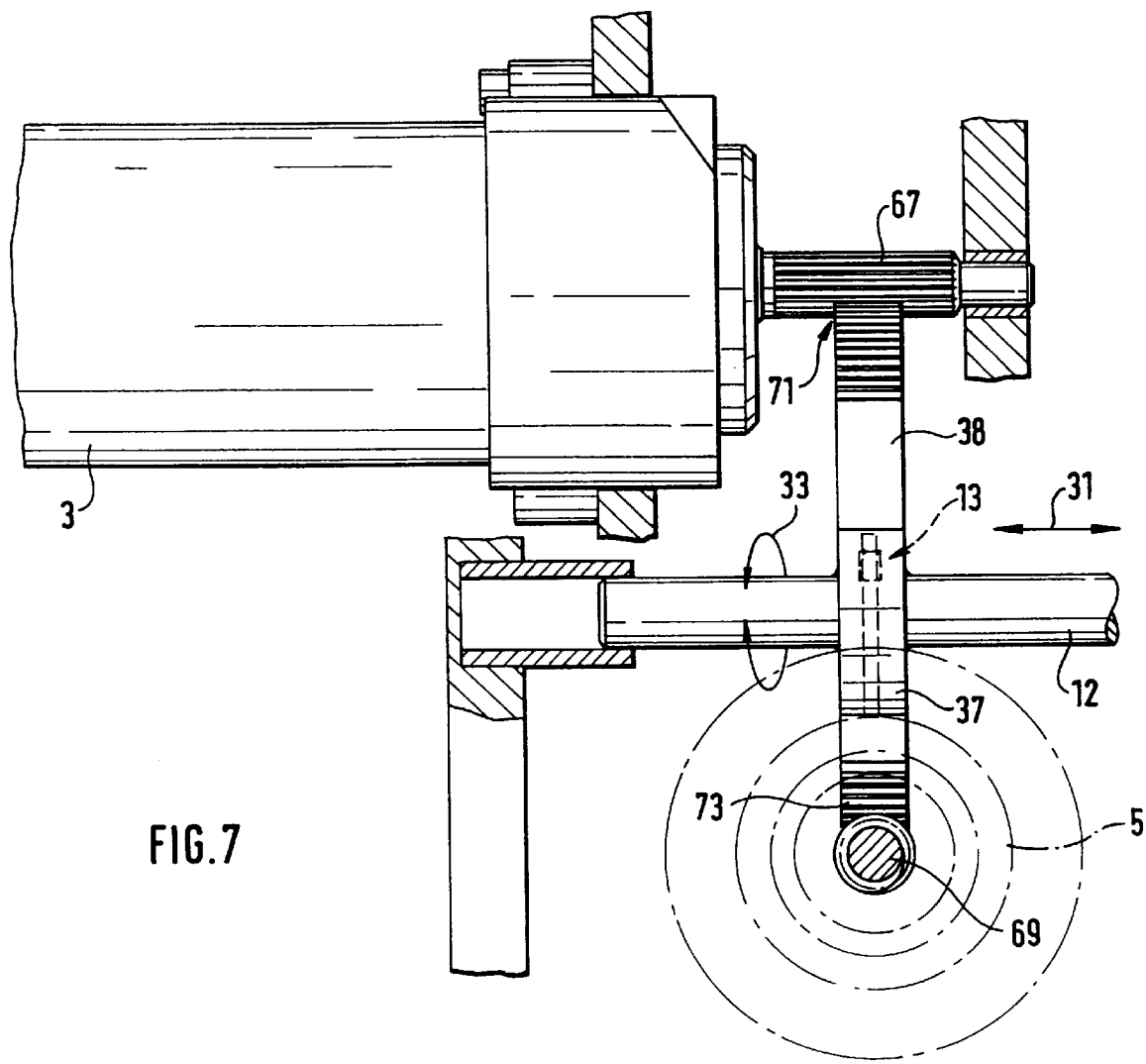
FIG. 7 shows a side view of FIG. 6.

In the actuating device 1 represented in FIGS. 6 and 7, the drives 3, 5 are connected via a transmitting element 37 firmly connected to the shifting shaft 12. The transmitting element 37 comprises a segmented wheel part 38 with the first teeth 71 which engage with the output part 67 of the first drive 3. When the first drive 3 is driven, the segmented toothed wheel part 38, and thus the shifting shaft 12 are driven in a rotary fashion. The transmitting element 37 has second teeth 73, which are arranged at right angles to the first teeth 71 and parallel to and coaxial with the shifting shaft 12, and which engage with the output part 69 of the drive 5. The initiated torque of the respective drive 3, 5 is transformed by the radial spacing between the teeth 71, 73 relative to the shifting shaft 12. The teeth 71, 73 are constructed so that the shifting shaft 12 can be driven by the drives 3, 5 in a decoupled fashion in the various directions of movement 7, 9. The second teeth 73 extend over a region in the circumferential direction in a fashion coaxial to the shifting shaft 12, with the result that when the transmitting element 37 is deflected in a rotary fashion by the first drive 3 it is ensured that the second teeth 73 engage with the output part 69. The transmitting element 37 is provided with the sensors 13, 15, which detect the respective actuating movement of the shifting shaft 12.

The remaining design, and the mode of operation of said actuating device 1 is no different from the actuating device 1 described with the aid of FIG. 1.

The invention is not limited by the embodiments described above which are presented as examples only but can be modified in various ways within the scope of protection defined by the appended patent claims.

We claim:

1. An actuating device for automatically actuating a manual transmission of a vehicle, comprising:

an output element;

first drive means for driving the output element in a first direction;

second drive means for driving the output element in a second direction;

control means for controlling the first and the second drive means; and first sensor means assigned to each of the drive means for detecting movement of the output element and outputting corresponding signals to the control means, which signals specify a respective magnitude of movement, the control means being operative to use said signals with reference to an arbitrary prescribable reference point to determine an actual position of the output element and relate the actual position to a desired position of the output element which is to be approached, whereby perception that the desired position has not been reached after termination of one of an actuating movement and an absence of the signals which indicate the actuating movement causes the control means to activate an emergency function.

2. An actuating device according to claim 1, wherein the control means is operative to carry out an adjusting routine in predeterminable operating situations, the reference point being at least briefly in the adjusting routine, the desired position being approached starting from this position.

3. An actuating device according to claim 2, wherein the control means is operative to run the adjusting routine upon starting the vehicle.

4. An actuating device according to claim 3, wherein the control means is operative to actuate the adjusting routine in response to a signal which indicates actuation of an ignition lock of the vehicle, and a signal indicating actuation of a vehicle brake.

5. An actuating device according to claim 3, wherein the control means is operative to carry out a restricted adjusting routine, in which it is not necessary to disengage a gear engaged in the transmission, in response to opening of a driver's door of the vehicle.

6. An actuating device according to claim 2, and further comprising means for detecting a stop reached during movement of the output element, the adjusting routine being initiated by detection of the stop which is evaluated as a consequence of maladjustment of the output element.

7. An actuating device according to claim 1, wherein the output element is movable into a change position in which the output element has two degrees of freedom, the control means being operative so that, starting from the change position, the output element occupies the reference point with reference to the second direction of movement and, if the reference point is not yet occupied, occupies the reference point by deflection in the first direction of movement.

8. An actuating device according to class 1, wherein the control means is operative so that the output element occupies the reference point in at least one direction of movement when at least one stop has been reached with reference to the direction of movement.

9. An actuating device according to claim 7, wherein one of the directions of movement is a slot-selecting direction of the transmission, the reference point being occupied in the slot-selecting direction when the stop is reached in a prescribed direction with reference to said direction of movement.

10. An actuating device according to claim 7, and further comprising second sensor means assigned to the stop for detecting when the output element reaches the stop and for relaying corresponding signals to the control means.

11. An actuating device according to claim 1, wherein the actuating means includes time-measuring means for prescribing a first time interval, in which the output element is prevented from further deflection in the first direction of movement by reaching a stop, and for prescribing a second time interval in which the output element is moved in a direction opposite to said first direction of movement in order to occupy a change position.

12. An actuating device according to claim 8, and further comprising power consumption detecting means arranged at at least of the drive means for detecting power consumption of the drive means whereby determination that the stop has been reached can be made by detection of an increased power consumption.

13. An actuating device according to claim 1, and further comprising gear shift lever means for selecting the desired position of the output element, and second sensor means for sensing shift positions of the gear shift lever and feeding corresponding signals to the control means.

14. An actuating device according to claim 1, and further comprising gear selection control means for prescribing the desired position of the output element, the gear selection control means taking into account a plurality of operating parameters to determine an instantaneous favorable driving gear and relaying the driving gear as a desired position to the control means.

15. An actuating device according to claim 1, wherein the control means includes a nonvolatile memory in which signals are stored which represent actuating paths which can be picked up by the first sensor means assigned to the drive means, and which correspond, with reference to the reference point, to the desired positions assigned to various driving gears of the transmission.

16. An actuating device according to claim 15, wherein the nonvolatile memory is configured so that the signals stored therein can be replaced in case of a change in drive train configuration.

17. An actuating device according to claim 1, wherein the first sensor means are configured to directly detect actuating movement of the drive means and are integrated in the drive means.

18. An actuating device according to claim 1, wherein the control means is operative so that in case of an activation of the emergency function the output element occupies the desired position starting from an arbitrary predeterminable emergency reference point, the first drive means being operative to move the output element occupying the emergency reference point for a first emergency control time interval after expiration of which the output element bears against a stop located in the direction of approach, and by means of positional information obtained from the sensing means with reference to said first direction of movement when the stop is struck, the first drive means is operative to drive the output element in the opposite direction to a change position from which the output element is deflected by driving the second drive means over a second emergency time interval into the second direction of movement, whereby the output element bears against a stop located in the direction of deflection after expiration of the second emergency time interval and being positioned at the emergency reference point via positional information obtained when the stop is struck in the case of an emergency reference point deviating from said position.

19. An actuating device according to claim 18, wherein the control means is operative to drive the output element, at least shortly before potentially reaching the change position, alternately in the first direction of movement and the second direction of movement, the change position being detectable by a gain in freedom of movement in the second direction of movement.

20. An actuating device according to claim 19, and further comprising means for detecting the change position as a function of a comparable power consumption of the wo drive means in successive intervals, corresponding to an initiated movement.

21. An actuating device according to claim 18, wherein the emergency reference point corresponds to the reference point.

22. An actuating device according to claim 18, wherein the control means includes nonvolatile memory means for storing drive time intervals which are assigned to various driving gears and intended for engaging a desired driving gear via the drive means, so as to ensure the emergency function.

* * * * *